(12) United States Patent
Yu et al.

(10) Patent No.: US 10,793,475 B2
(45) Date of Patent: Oct. 6, 2020

(54) METHOD FOR MAKING HOUSING FOR MOBILE COMMUNICATION DEVICE

(71) Applicant: AAC Technologies Pte. Ltd., Singapore (SG)

(72) Inventors: Jinhui Yu, Shenzhen (CN); Jie He, Shenzhen (CN); Rong Li, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 338 days.

(21) Appl. No.: 15/869,179

(22) Filed: Jan. 12, 2018

(65) Prior Publication Data

US 2018/0370858 A1 Dec. 27, 2018

(30) Foreign Application Priority Data

Jun. 22, 2017 (CN) .......................... 2017 1 0482840
Jun. 22, 2017 (CN) .......................... 2017 1 0482842

(51) Int. Cl.
*C04B 35/49* (2006.01)
*C04B 35/48* (2006.01)
(Continued)

(52) U.S. Cl.
CPC .............. *C04B 35/49* (2013.01); *B32B 18/00* (2013.01); *C04B 35/48* (2013.01); *C04B 35/481* (2013.01); *C04B 35/6264* (2013.01); *C04B 35/62218* (2013.01); *C04B 35/638* (2013.01); *C04B 35/6342* (2013.01); *C04B 35/645* (2013.01);
(Continued)

(58) Field of Classification Search
CPC .... C04B 2235/3225; C04B 2235/3232; C04B 2235/3244; C04B 2235/3418; C04B 2235/6025; C04B 2235/612; C04B 2235/6562; C04B 2235/6567; C04B 2235/6581; C04B 2235/6583; C04B 2237/348; C04B 2237/704; C04B 35/48; C04B 35/481; C04B 35/49;
(Continued)

(56) References Cited

U.S. PATENT DOCUMENTS 5,244,621 A * 9/1993 Wakai ................. C04B 35/5935
264/291
2015/0232390 A1 * 8/2015 Xie ......................... B32B 18/00
264/670

(Continued)

*Primary Examiner* — Matthew J Daniels
*Assistant Examiner* — Yunju Kim
(74) *Attorney, Agent, or Firm* — IPro, PLLC; Na Xu

(57) ABSTRACT

The present disclosure provides a method for making a housing for a mobile communication device, comprising: step S1: mixing a zirconia ceramic powder, a solvent and a binder to form a mixed slurry; step S2: tape-casting the mixed slurry to form a single layer of base membrane band, and then preparing at least one layer of laminated membrane band on the base membrane band by lamination and isostatic pressing, so as to form a laminated body; step S3: debinding, sintering and hot-bending the laminated body to obtain a compact ceramic housing for a mobile communication device; wherein step S3 is performed in one common step combining sintering and hot bending or by hot bending a flat sample, which has beneficial effects such as high yield, low production cost, good product compactness, good fracture toughness, and good flexural strength, etc.

7 Claims, 2 Drawing Sheets

(51) Int. Cl.
    *C04B 35/634*     (2006.01)
    *C04B 35/626*     (2006.01)
    *C04B 35/622*     (2006.01)
    *C04B 35/638*     (2006.01)
    *C04B 35/645*     (2006.01)
    *B32B 18/00*     (2006.01)

(52) U.S. Cl.
    CPC .................. *C04B 2235/3225* (2013.01); *C04B 2235/3232* (2013.01); *C04B 2235/3244* (2013.01); *C04B 2235/3418* (2013.01); *C04B 2235/6025* (2013.01); *C04B 2235/612* (2013.01); *C04B 2235/6562* (2013.01); *C04B 2235/6567* (2013.01); *C04B 2235/6581* (2013.01); *C04B 2235/6583* (2013.01); *C04B 2237/348* (2013.01); *C04B 2237/704* (2013.01)

(58) Field of Classification Search
    CPC .......... C04B 35/62218; C04B 35/6264; C04B 35/6342; C04B 35/638; C04B 35/645
    USPC ........................................................ 264/434
    See application file for complete search history.

(56) References Cited

U.S. PATENT DOCUMENTS

| | | | |
|---|---|---|---|
| 2016/0081777 A1* | 3/2016 | Yamada | .................. C04B 35/64 |
| | | | 428/220 |
| 2017/0152192 A1* | 6/2017 | Lin | ...................... C04B 35/6261 |
| 2018/0009697 A1* | 1/2018 | He | .......................... C03C 3/087 |

\* cited by examiner

METHOD FOR MAKING HOUSING FOR MOBILE COMMUNICATION DEVICE

TECHNICAL FIELD

The present disclosure relates to the field of ceramic products and, particularly, relates to a method for making a housing for a mobile communication device.

BACKGROUND

With the development of the cellphone mobile network, the existing 4g technologies cannot satisfy the needs of high-speed information transmission, while the 5g technologies have more strict requirements on design of a cellphone antenna and a material of a cellphone housing. At present, the maturely applied metal housing and nano-molding process cannot satisfy the needs for 5g signal, and a glass has a good transmittance for signals but low strength, and thus easily breaks when falling off. The ceramics have become the most promising housing material of the next generation.

As for preparation of a ceramic cellphone housing, the widely applied solutions includes a solution of a computer numerical control (Computer Numerical Control, CNC) direct process, and a solution of a dry pressing preforming and a followed CNC process. The CNC direct process refers to a process in which a thick ceramic plate is directly processed into a cellphone housing by a CNC process. The solution of a dry pressing preforming and a followed CNC process refers to a process in which a green body or a pre-sintered body is processed into a cellphone housing with a certain machining allowance, the cellphone with the certain machining allowance is then sintered, and finally the sintered body is finely processed by a CNC process. As for the CNC direct process, since the cellphone housing is made by directly using a thick plate, it has disadvantages such as high cost of materials and process, and low process efficiency, and thus is not widely applied in the market. As for the solution of a dry pressing preforming and a followed CNC process, since the product deforms greatly during the sintering process and thus has a low yield and a low uniformity, moreover, the CNC process is also needed, it generally has disadvantages such as low process efficiency and high cost. In addition, both solutions include sintering, which increases the risk of deformation of the product during sintering, causing low yield.

Therefore, it is necessary to provide a new housing for a mobile communication device, to solve the abovementioned problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure.

DESCRIPTION OF EMBODIMENTS

The technologies of the present disclosure will be further described with reference to the accompanying drawing and the embodiments.

Figure 1:
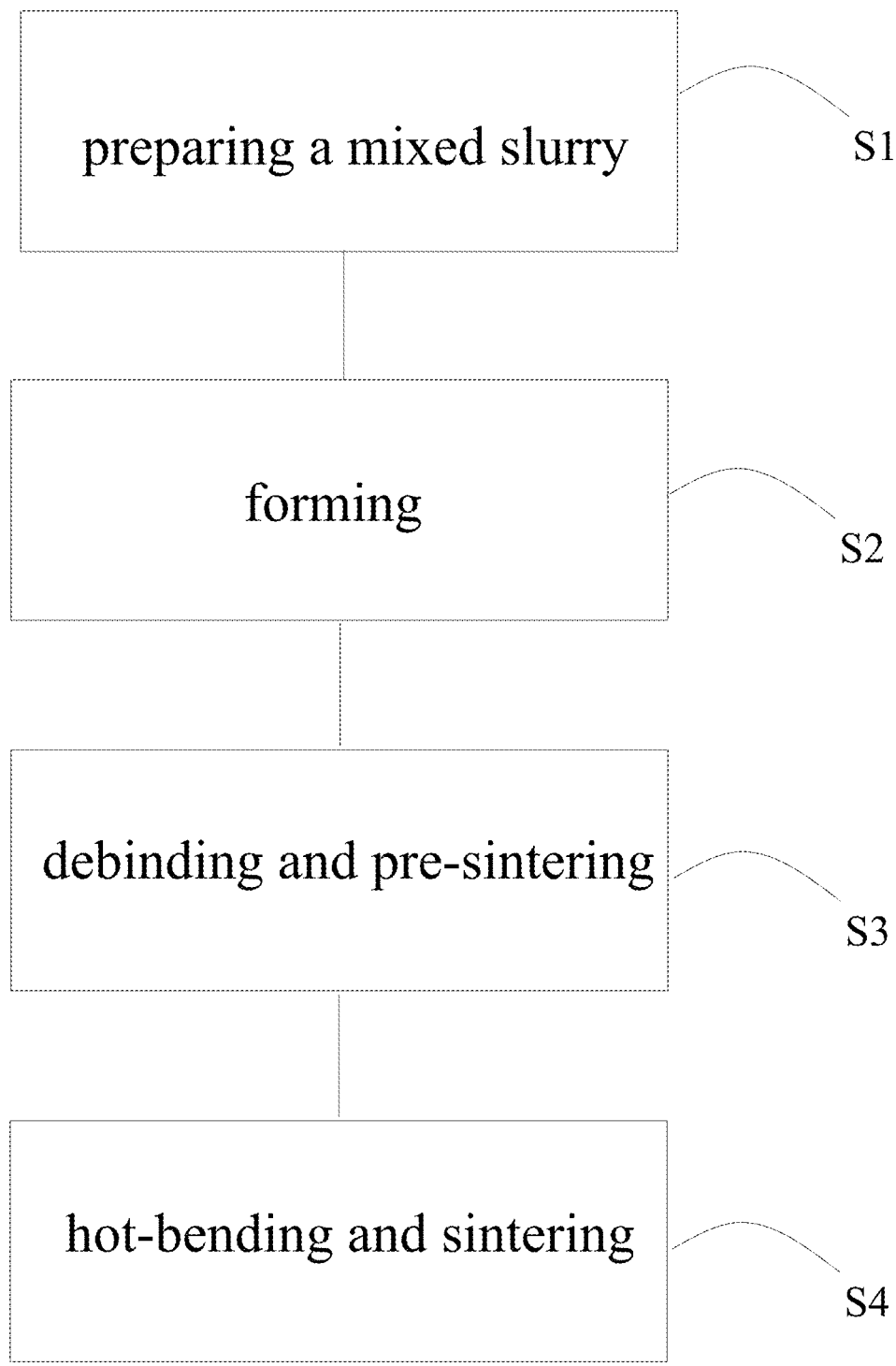
FIG. 1 illustrates a flowchart of a method for making a housing for a communication device according to Embodiment 1 of the present disclosure.
Figure 2:
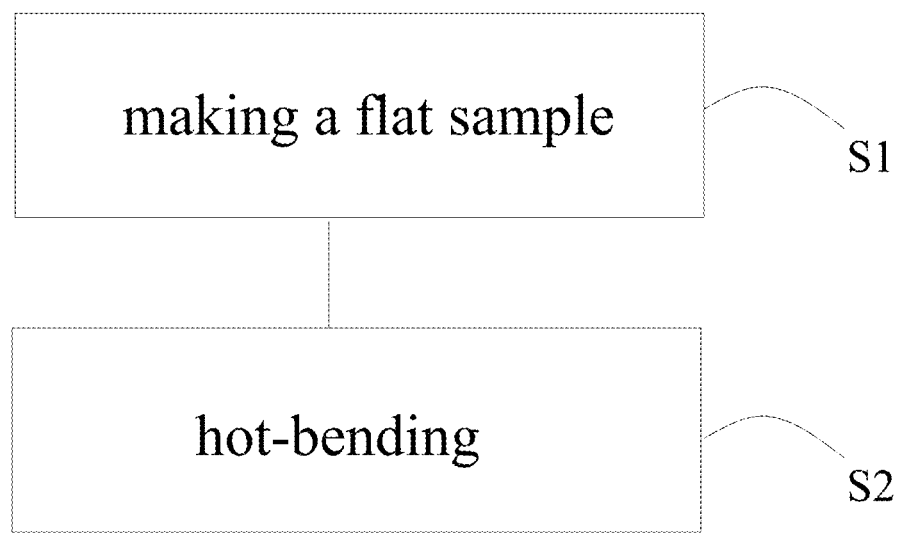
FIG. 2 illustrates a flowchart of a method for making a housing for a communication device according to Embodiment 2 of the present disclosure.

With reference to FIGS. 1 and 2, the present disclosure provides a method for making a housing for a mobile communication device, which has beneficial effects such as high yield, low production cost, good product compactness, good fracture toughness, and good flexural strength, etc.

The method including:

step S1: mixing a zirconia ceramic powder, a solvent, and a binder to form a mixed slurry;

step S2: tape-casting the mixed slurry to form a monolayer base membrane band, and then making at least one layer of laminated membrane band on the base membrane band by lamination and isostatic pressing, thereby forming a laminated body;

step S3: debinding, sintering, and hot-bending the laminated body to obtain a compact ceramic housing for a mobile communication device.

Embodiment 1

With reference to FIG. 1, Embodiment 1 of the present disclosure provides a method for making a housing for a mobile communication device, including steps as follows:

step S1, slurry mixing: mixing a zirconia ceramic powder, a solvent, and a binder to form a mixed slurry;

wherein the zirconia ceramic powder is added with a powder selected from a group consisting of a yttrium oxide powder, a titanium oxide powder, a silicon oxide powder, and combinations thereof; and the solvent is alcohol or toluene;

step S2, forming: tape-casting the mixed slurry to obtain a monolayer base membrane band with a thickness of 0-1 mm, then making a plurality of laminated membrane bands with different thicknesses on the base membrane band by lamination and isostatic pressing, and then cutting the membrane bands to form a plurality of laminated bodies with certain sizes;

step S3: debinding and pre-sintering the laminated body to obtain a preformed green body, including:

step S31, debinding at a temperature in a range of 300-600° C. for 20-50 h; and step S32, pre-sintering at a temperature in a range of 1000-1300° C. for 0-5 h with a heating rate of 0-5° C./min; and step S4, hot-bending and secondary sintering: placing the preformed green body in a predesigned mold for the housing for a mobile communication device, performing hot-bending and secondary sintering under pressure when increasing or decreasing the temperature, so as to obtain a housing for a mobile communication device having a same profile as a profile of a mold cavity of the mold under comprehensive action of the temperature and pressure, during which the ceramic material is compacted, and thus the obtained product is a compact ceramic housing for a mobile communication device;

wherein the predesigned mold for the housing for a mobile communication device is made of graphite, silicon carbide, or a composite material thereof; the hot bending and the secondary sintering are performed in a sintering furnace, such as vacuum sintering furnace, atmosphere sintering furnace, or air furnace, etc; the hot bending is performed at a temperature in a range of 1300-1500° C. for 0-5 h with a heating rate of 0-5° C./min, preferably, under a pressure in a range of 0-1000N, such that a more compact ceramic structure can be obtained.

Compared with the prior art, in the method for making a housing for a mobile communication device in the present embodiment, the sintering and hot bending are performed by a common step, which reduces the procedures, and thus reduces the risk of deformation caused by an independent sintering, thereby significantly improving the yield of the product and reducing the production cost; in addition, since the sintering is performed by adding a certain pressure, the finally formed product has good compactness, good fracture toughness and good flexural strength.

Embodiment 2

With reference to FIG. 2, Embodiment 2 of the present disclosure provides a method for making a housing for a communication device, which has beneficial effects such as high yield, low production cost, good product compactness, good fracture toughness, and good flexural strength, etc.

The method includes following steps:

step S1: making a flat sample from a zirconia ceramic material;

step S2: placing the flat sample in a predesigned mold for a housing for a mobile communication device, performing hot bending under pressure when increasing or decreasing the temperature, so as to obtain a housing for a mobile communication device having a same profile as a profile of a mold cavity of the mold under comprehensive action of the temperature and pressure;

wherein the predesigned mold for the housing for a mobile communication device is made of graphite, silicon carbide, or a composite material thereof; an equipment used for the hot bending is a hot bending machine; the hot bending is performed at a temperature in a range of 700-1000° C. for 0-5 min, preferably, under a pressure in a range of 0-1000N, such that a more compact ceramic structure can be obtained.

step S1 includes:

step S11, slurry mixing: mixing a zirconia ceramic powder, a solvent, and a binder to form a mixed slurry;

wherein the zirconia ceramic powder is added with a powder selected from a group consisting of yttrium oxide powder, titanium oxide powder, silicon oxide powder, and combinations thereof: and the solvent is alcohol or toluene.

step S12, forming: tape-casting the mixed slurry to obtain a monolayer base membrane band with a thickness of 0-1 mm, then making a plurality of laminated membrane bands with different thicknesses on the base membrane band by lamination and isostatic pressing, and then cutting the membrane bands to form a plurality of laminated bodies with certain sizes;

step S13: debinding and pre-sintering the laminated body to obtain a flat semi-finished sample, including:

step S131, debinding at a temperature in a range of 300-600° C. for 20-50 h; and step S132, sintering at a temperature in a range of 1200-1500° C. for 0-5 h with a heating rate of 0-5° C./min; and step S14: plane-grinding the flat semi-finished sample obtained in step S13 to obtain a flat sample with a uniform thickness, and then performing hot bending formation.

Compared with the prior art, in the method for making a housing for a mobile communication device in the present embodiment, the hot bending is performed after a flat sample is prepared, which reduces the risk of product deformation caused by sintering a finished product, thereby significantly improving the yield of the product and reducing the production cost; in addition, since the sintering is performed under a certain pressure, the finally formed product has good compactness, good fracture toughness and good flexural strength.

The above are merely exemplary embodiments of the present embodiment, which do not limit the scope of the present disclosure, and all equivalent modifications made to structures and flow chart, and direct or direct applications in other technical fields based on the description and drawings of the present disclosure shall fall into the protection scope of the present disclosure.

What is claimed is:

1. A method for making a housing for a mobile communication device, comprising:

step S1: mixing a zirconia ceramic powder, a solvent, and a binder to form a mixed slurry;

step S2: tape-casting the mixed slurry to form a monolayer base membrane band, and then making at least one layer of laminated membrane band on the base membrane band by lamination and isostatic pressing, thereby forming a laminated body; and step S3: debinding, sintering, and hot-bending the laminated body to obtain a compact ceramic housing for a mobile communication device;

wherein, the step S3 of debinding, sintering and hot-bending the laminated body to obtain a compact ceramic housing for a mobile communication device comprises:

step S31: debinding and sintering the laminated body to obtain a flat semi-finished product;

step S32: plane-grinding the flat semi-finished product obtained in step S31 to obtain a flat sample with a uniform thickness; and step S33: placing the flat sample in a predesigned mold for the housing for a mobile communication device, performing hot-bending under a pressure of 0-1000N when increasing or decreasing a temperature within 700-1000° C. for 0-5 min.

2. The method for making a housing for a mobile communication device as described in claim 1, wherein the hot-bending is performed by using a predesigned mold for the housing for a mobile communication device, and the predesigned mold is made of graphite, silicon carbide, or a composite material thereof.

3. The method for making a housing for a mobile communication device as described in claim 1, wherein the zirconia ceramic powder in the step S1 is added with a powder selected from a group consisting of a yttrium oxide powder, a titanium oxide powder, a silicon oxide powder, and combinations thereof.

4. The method for making a housing for a mobile communication device as described in claim 1, wherein the solvent in the step S1 is alcohol or toluene.

5. The method for making a housing for a mobile communication device as described in claim 1, wherein a thickness of the base membrane band obtained in the step S2 is in a range of 0-1 mm.

6. The method for making a housing for a mobile communication device as described in claim 1, wherein the debinding in the step S3 is performed at a temperature in a range of 300–600° C. for 20-50 h.

7. The method for making a housing for a mobile communication device as described in claim 1, wherein the sintering in the step S31 is performed at a temperature of 1200-1500° C. for 0-5 h with a heating rate of 0-5° C./min.

* * * * *